United States Patent
Gunnarsson et al.

(10) Patent No.: US 10,057,802 B2
(45) Date of Patent: Aug. 21, 2018

(54) COVERAGE DETERMINATION USING CORRELATED RADIO CONDITION MEASUREMENTS AND POSITION ESTIMATES

(71) Applicant: Telefonaktiebolaget LM Ericsson (publ), Stockholm (SE)

(72) Inventors: Fredrik Gunnarsson, Linköping (SE); Claes Bäckström, Sollentuna (SE); Bo Hagerman, Tyresö (SE); Jimmy O'Meara, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 15/117,540

(22) PCT Filed: Oct. 8, 2014

(86) PCT No.: PCT/SE2014/051181
§ 371 (c)(1),
(2) Date: Aug. 9, 2016

(87) PCT Pub. No.: WO2015/122822
PCT Pub. Date: Aug. 20, 2015

(65) Prior Publication Data
US 2016/0353302 A1    Dec. 1, 2016

Related U.S. Application Data

(60) Provisional application No. 61/938,379, filed on Feb. 11, 2014.

(51) Int. Cl.
*H04W 24/10* (2009.01)
*H04W 16/20* (2009.01)
(Continued)

(52) U.S. Cl.
CPC .......... *H04W 24/10* (2013.01); *H04W 16/18* (2013.01); *H04W 16/20* (2013.01); *H04W 24/02* (2013.01); *H04W 24/08* (2013.01); *H04W 72/085* (2013.01)

(58) Field of Classification Search
None
See application file for complete search history.

(56) References Cited

U.S. PATENT DOCUMENTS 6,052,583 A * 4/2000 Bernardin ............. H04W 16/18
455/423
8,498,811 B2    7/2013 Lundquist et al.
(Continued)

FOREIGN PATENT DOCUMENTS

WO       2010034495 A1    4/2010
WO    WO 2011134518 A1 * 11/2011 ............ H04W 48/08
(Continued)

OTHER PUBLICATIONS

Schroder, A.,et al., "User-assisted Coverage and Interference Optimization for Broadband Fremtocells", Integrated Network Management—Workshops, Jun. 1, 2009, pp. 199-204, IEEE.

*Primary Examiner* — Bunjob Jaroenchonwanit
(74) *Attorney, Agent, or Firm* — Sage Patent Group

(57) ABSTRACT

The present disclosure relates to coverage monitoring and in particular it relates to determining radio coverage using correlated radio condition measurements and position estimates, for example for small cell deployment in a building. The disclosure relates to methods for coverage determination as well as to corresponding devices and computer programs. According to some aspects, the disclosure proposes a method, performed in a node 10, 110 of determining radio coverage of at least one small cell base station in a wireless communications network. The method comprises the steps of obtaining radio condition measurements, (Continued)

wherein a respective first time value is associated to each radio condition measurement. The method further comprises obtaining position estimates defining the position of a wireless device performing the radio condition measurements, wherein a respective second time value is associated to each position estimate and determining radio coverage by correlating each radio condition measurement to one of the obtained position estimates using the first and second time values.

24 Claims, 12 Drawing Sheets

(51) Int. Cl.
*H04W 24/02* (2009.01)
*H04W 24/08* (2009.01)
*H04W 72/08* (2009.01)
*H04W 16/18* (2009.01)

(56) References Cited

U.S. PATENT DOCUMENTS

| | | |
|---|---|---|
| 2002/0111772 A1 | 8/2002 | Skidmore et al. |
| 2004/0267928 A1* | 12/2004 | Petrus .................. H04W 24/00 709/225 |
| 2005/0073983 A1 | 4/2005 | Diener |
| 2005/0185618 A1* | 8/2005 | Friday .................. G01S 5/0252 370/331 |
| 2007/0042799 A1 | 2/2007 | Jubin et al. |
| 2009/0191878 A1* | 7/2009 | Hedqvist ............... H04W 36/32 455/441 |
| 2010/0323702 A1* | 12/2010 | Yang .................... H04W 36/32 455/437 |
| 2012/0322488 A1 | 12/2012 | Johansson et al. |
| 2013/0070726 A1* | 3/2013 | Zhang ............... H04W 56/0045 370/331 |
| 2013/0115956 A1 | 5/2013 | Ewert et al. |
| 2013/0150043 A1* | 6/2013 | Park ...................... H04W 16/32 455/436 |
| 2013/0217413 A1* | 8/2013 | Sanders .................... G01S 3/30 455/456.1 |
| 2013/0225229 A1 | 8/2013 | Al-Shalash |
| 2014/0071856 A1* | 3/2014 | Brisebois .............. H04W 56/00 370/255 |
| 2014/0112288 A1* | 4/2014 | Wei ...................... H04J 11/0053 370/329 |
| 2014/0295884 A1* | 10/2014 | Racz ..................... H04W 24/00 455/456.1 |
| 2016/0353302 A1 | 12/2016 | Gunnarsson et al. |
| 2017/0078893 A1* | 3/2017 | Hyslop ................. H04W 16/24 |
| 2017/0118213 A1* | 4/2017 | Edge ................. H04L 63/0876 |
| 2017/0238275 A1 | 8/2017 | De Pasquale et al. |

FOREIGN PATENT DOCUMENTS

| | | |
|---|---|---|
| WO | 2013062451 A1 | 5/2013 |
| WO | 2015122821 A1 | 8/2015 |

* cited by examiner

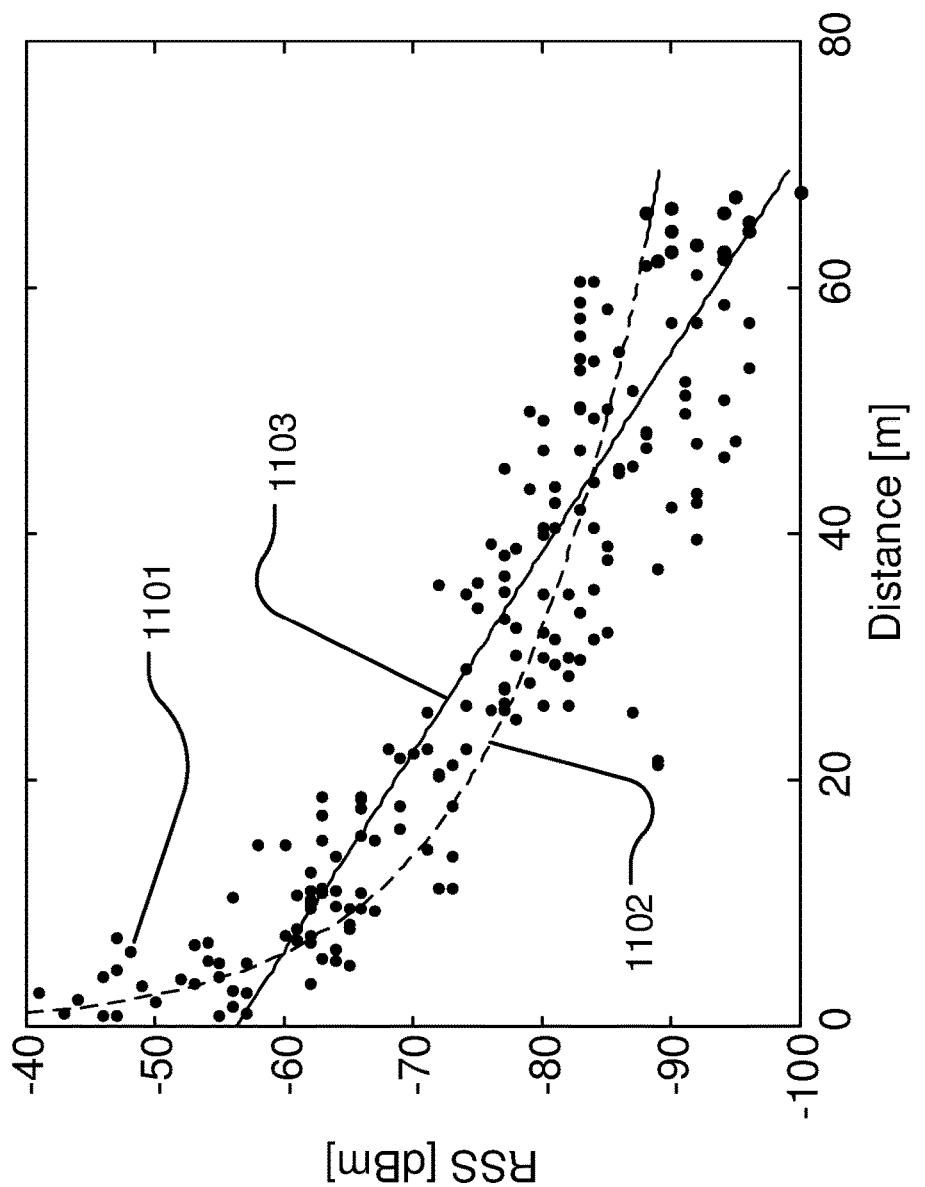

COVERAGE DETERMINATION USING CORRELATED RADIO CONDITION MEASUREMENTS AND POSITION ESTIMATES

TECHNICAL FIELD

The present disclosure relates to coverage monitoring and in particular it relates to determining radio coverage using correlated radio condition measurements and position estimates, for example for small cell deployment in a building. The disclosure relates to methods for coverage determination as well as to corresponding devices and computer programs.

BACKGROUND

3GPP Long Term Evolution, LTE, is the fourth-generation mobile communication technology standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. The Evolved UMTS Terrestrial Radio Access Network, E-UTRAN, consists of base stations called enhanced NodeBs, which may be abbreviated eNBs or eNodeBs, providing the E-UTRA user plane and control plane protocol terminations towards the UE. The eNBs are interconnected with each other by means of the X2 interface. The eNBs are also connected by means of the S1 interface to the Evolved Packet Core, EPC.

Cellular service providers manage their networks for example by splitting cells with multiple base stations or adding additional base stations. Typically small cells, for example pico cells, are added within the cells in order to off-load the network and to increase coverage. The impact of these actions has an effect on the coverage provided, and the service provider requires knowledge of the impact on the quality of their network.

Existing localized coverage monitoring is either based on crude network-based positioning of data, or global navigation satellite system, global navigation satellite system, GNSS-enabled handsets providing localized measurements. As an example of network-based monitoring, in current cellular systems, service providers detect coverage holes by monitoring dropped calls, logging customer complaints, or having technicians move through the cellular system measuring signal strength.

Examples of GNSS-based localization include dedicated handsets such as TEMS (TEst Mobile System) investigation by Ascom, which is the industry standard tool for GNSS-enabled drive test. Coverage monitoring by means of GNSS-enabled handsets is available in rural to urban areas, but in such areas small cells are typically not deployed, and it is not practical to analyze macro cell coverage unless a large number of wireless devices are participating in the monitoring. This is potentially possible via standardized efforts like Minimization of Drive Tests, but only wireless devices that have provided user consent will participate in the monitoring, which means that it will take a significant time to monitor the macro cell coverage. Coverage monitoring by means of GNSS-enabled handsets is generally not available indoors or in dense urban regions.

SUMMARY

Small cell deployments typically target rather focused traffic hotspots. If the site where the small cell is deployed is selected well, the benefits from deploying the small cell are significant; if not, the benefits can be negligible. Today there is no convenient way of verifying the small cell coverage after the installation, especially not when the small cell is deployed indoor or in dense urban areas.

An object of the present disclosure is to provide a method for coverage determination which seeks to mitigate, alleviate, or eliminate one or more of the above-identified deficiencies in the art and disadvantages singly or in any combination.

The disclosure proposes a coverage verification method applicable when GNSS is not applicable or even available. According to some aspects, the method is based on a wireless device, capable of locating itself without GNSS.

According to some aspects, the disclosure proposes a method, performed in a node in a radio network of determining radio coverage of at least one small cell base station in a wireless communications network. The method comprises the steps of obtaining radio condition measurements, wherein a respective first time value is associated to each radio condition measurement. The method further comprises obtaining position estimates defining the position of a wireless device performing the radio condition measurements, wherein a respective second time value is associated to each position estimate and determining radio coverage by correlating each radio condition measurement to one of the obtained position estimates using the first and second time values. Because time stamped positions over user plane can be combined with RAN-initiated time-stamped radio measurements via radio protocols/control plane, it is possible to utilize the standardized radio measurements, which implies that the results of the measurements are foreseeable and controlled. An advantage is that the standardized radio measurements are subject to extensive tests and calibrations to ensure that the measurements are comparable. Furthermore, it is possible to, via the radio protocols, order a wireless device to measure not only the radio access technology and frequency at which it is currently served, but also other frequencies with the same radio access technology, or different radio access technology. This means that certain wireless devices can be configured for extensive measurements, much more than regular operation would require to enable time-efficient measurement campaigns. Furthermore, by exploiting the flexibility and potential accuracy of device-based positioning, it is possible to get better positioning compared to network based positioning.

According to some aspects, the method further comprises receiving and/or sending an indication to initiate determination of radio coverage. According to some aspects, the method further comprises determining cell deployment using the determined coverage and at least one deployment criteria. If the method is performed in a network node, the network node may by this kind of signaling order measurements in the control plane. The advantage is that the wireless device can initiate radio condition measurements at the same time as wireless device based positioning, and thereby ensure that the measurement procedure is efficient. Furthermore, as mentioned above, the initiating message can also instruct the wireless device to measure on other radio access technologies and/or frequencies, which makes the measurements efficient.

According to some aspects, the node is a wireless device and the determination further comprises measuring frequencies in accordance with a schedule.

According to some aspects, the node is a network node and the determination comprises receiving the radio condition measurements, from at least one wireless device, in accordance with a schedule.

According to some aspects, the disclosure relates to a node in a radio network configured to determine radio coverage. The node comprises a communication interface and processing circuitry configured to cause the node to obtain radio condition measurements, wherein a respective first time value is associated to each radio condition measurement, to obtain position estimates defining the position of a wireless device performing the radio condition measurements, wherein a respective second time value is associated to each position estimate; and to determine radio coverage by correlating each radio condition measurement to one of the obtained position estimates using the first and second time values.

According to some aspects, the disclosure relates to a computer program comprising computer program code which, when executed in a node, causes the node to execute the methods described above and below. The proposed technique provides a simple and automatic procedure for node coverage validation, planning and tuning. This is particularly important when the cost of the nodes to be deployed is low and thus a simple installation is desired.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIG. 11 illustrates examples of signal propagation models and signal strength measurements, where the propagation model parameters optionally are estimated based on the signal strength measurements

DETAILED DESCRIPTION

Figure 1A:
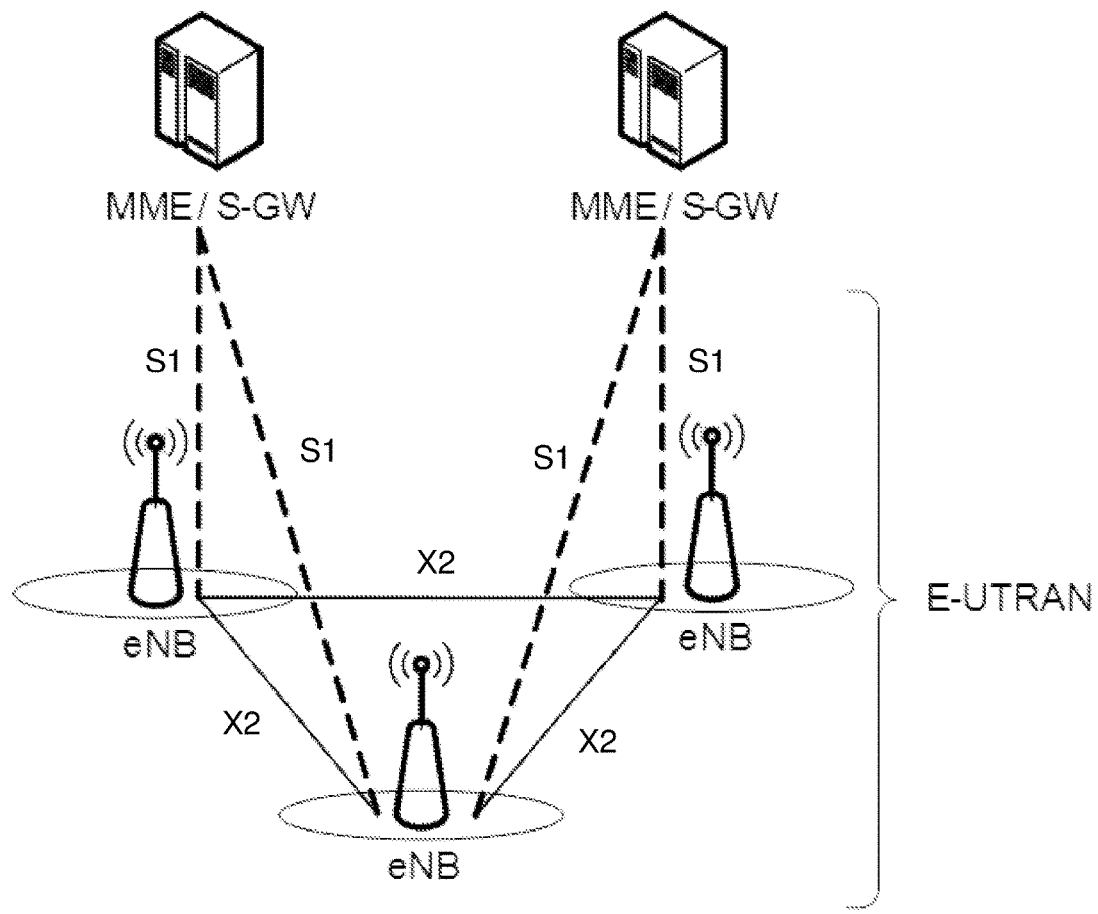
FIG. 1a shows an LTE architecture showing logical interfaces between eNBs and between eNB and MME/S-GW.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

LTE will be used as the exemplifying radio access technology. However, these embodiments are essentially equally applicable to other radio access technologies as well.

This disclosure refers to small cells. Small cells are generally defined as low-powered radio access nodes that operate in licensed and unlicensed spectrum, and that have a range of 10 meters to 1 or 2 kilometers. Small cells encompass femtocells, picocells, and microcells. Compare with mobile macrocells, which may have a range of a few tens of kilometers. In this application a small cell should be interpreted as any cell, which has a size such that it is possible or suitable to determine cell coverage using the proposed methods.

The idea is to use or utilize a wireless device to determine radio coverage, e.g. for example, coverage of a small cell or part of the coverage of a larger cell. Essentially the coverage determination is performed by moving the wireless device in the area to be determined. For example, the wireless device is carried around in a building. A typical implementation would be a software application downloaded in a mobile phone. The software application is running in the application plane and typically utilizes a processing unit running other applications.

Radio condition measurements are performed in all cellular systems and reported by the User Equipments, UE, here referred to more generally as wireless devices, by control plane signaling. Wireless device is a more generic term which covers more than UE, but in principle any device able to wirelessly communicate with other devices.

Furthermore wireless devices often comprise software and/or hardware that can be used for position estimation. Hence, position estimates can easily be collected by an application. Hence, such position estimation would then be made in the application plane, which implies that the information would be transmitted as user data in the cellular system. Embodiments herein relate to methods of correlating data available in the control plane with data available in the user plane in order to provide means for coverage determination. The correlation may be performed in different network nodes, e.g. in a wireless device or in a network node.

For better understanding of the technique, the architecture of the LTE system is now briefly described referring to FIG. 1a, including radio access nodes e.g. base stations, eNBs and evolved packet core nodes such as Mobility Management Entities, MME, and Serving Gateways, S-GW. The S1 interface is the interface between eNodeBs and the Mobility Management Entities, MME and Serving Gateways, S-GW. Both user data i.e. the application plane, and signaling i.e. the control plane, are supported by the S1 interface. In the user plane this interface will be based on GTP User Data Tunneling, GTP-U (GTP—GPRS Tunneling Protocol, GPRS—General Packet Radio Service).

In LTE the X2 interface has been defined between eNodeB, working in a meshed way, meaning that all NodeBs may be linked together. The main purpose of this interface is to minimize packet loss due to user mobility.

Figure 1B:
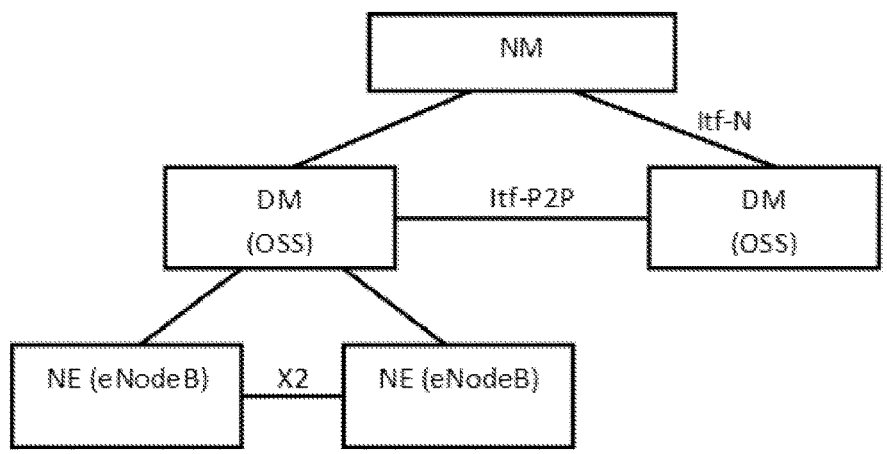
FIG. 1b shows an assumed management system in LTE.

The management system assumed in this disclosure is shown in FIG. 1b. The Node Elements, NE, also referred to as eNodeB, are managed by a domain manager, DM, also referred to as the Operation and Support System OSS. A DM may further be managed by a network manager, NM. Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM.

Figure 2:
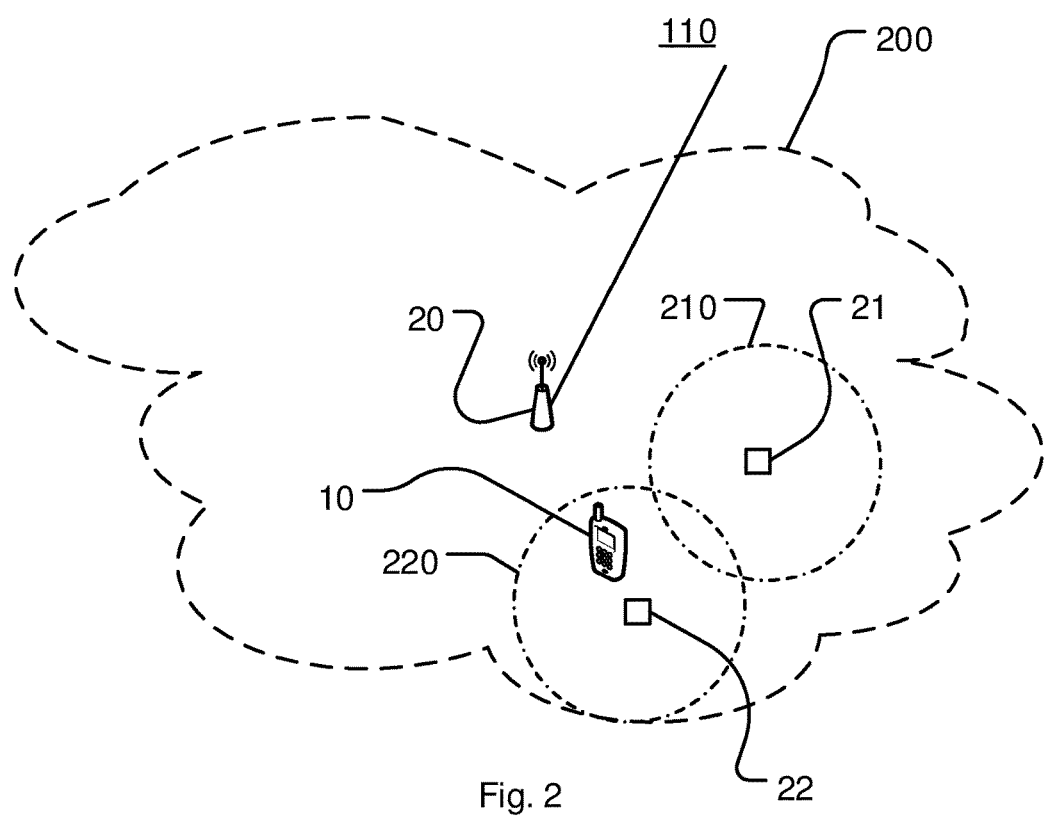
FIG. 2 shows a cell in a cellular network where the proposed methods may be implemented for cell deployment.

FIG. 2 illustrates a cellular network where the proposed method may be implemented. The cellular network comprises a macro cell 200 defined by a base station or, more generally, access point 20. The cellular network further comprises two small cells 210 and 220, defined by base stations 21 and 22, respectively. According to some example embodiments, the proposed technique is used to verify the installation of one of the base stations 21 or 22. According to some of the example embodiments, the proposed technique is used to decide whether further small cells should be deployed. The method uses a wireless device 10. The wireless device 10 is connected to at least one of the base stations, for example, the macro base station 20. The wireless device 10 communicates with a network node 110 via the cellular network. The network node 110 is part of the management system displayed in FIG. 1b. The network node may be a support node for network management terminals. It may also be a more general network management node, supporting performance monitoring, configuration management and/or fault management of the network elements in the network. Part of such tasks may also comprise interaction with terminals, either as a group, for example, all terminals served by a particular cell, or as individuals. The network node will be further described in connection with FIG. 9.

The proposed method relates to a method, performed in a node in a radio network of determining radio coverage of at least one small cell base station in a wireless communications network. The general concept of a determining coverage is shown in FIG. 3 and FIG. 4.

It should also be appreciated that the figures comprise some operations and blocks which are illustrated with a solid border and some operations and blocks, which are illustrated with a dashed border. The operations which are comprised in a solid border are associated with a more general example embodiment or aspect. The operations which are comprised in a dashed border are example embodiments, which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Figure 3:
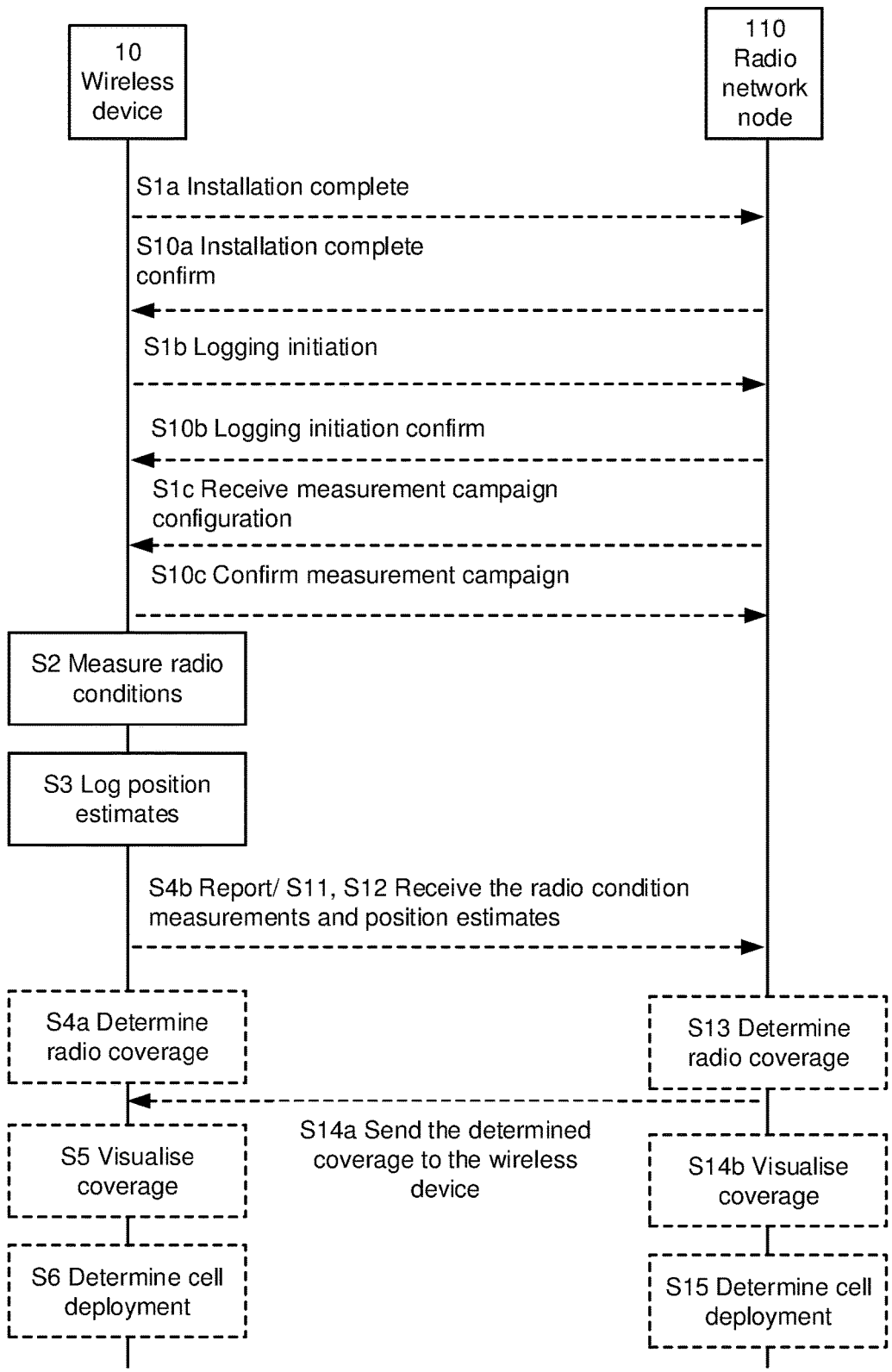
FIG. 3 is a signaling scheme illustrating the proposed technique.

FIG. 3 is a signaling scheme illustrating signaling between a wireless device performing radio condition measurements and a network node in a wireless communications network when performing the proposed methods. FIG. 3 illustrates that after performing the measurements using a wireless device, step S2 and S3, the coverage determination could either be performed in the wireless device, step S4a, or the values could be signaled S4b to a network node, for determination of coverage in the network node, step S13.

Figure 4:
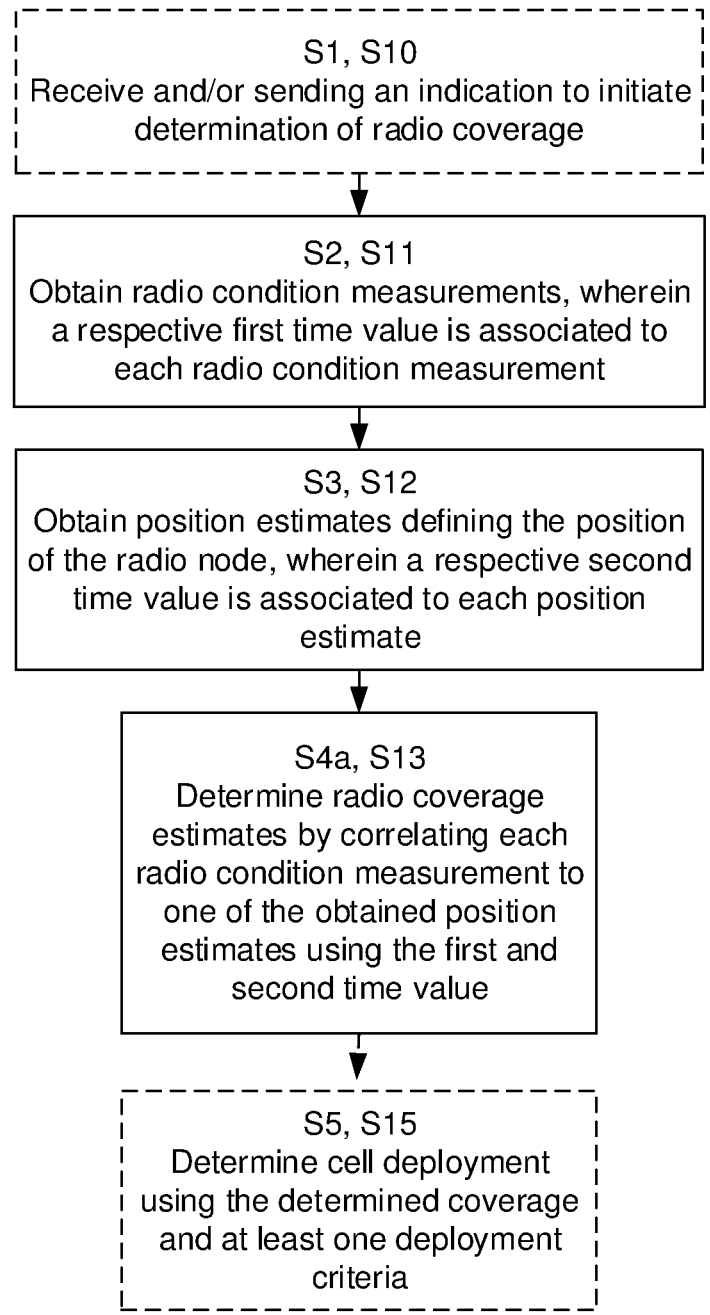
FIG. 4 is a flowchart schematically illustrating embodiments of method steps performed in a wireless device.

FIG. 4 illustrates coverage determination performed in the node being a wireless device or a network node where reference numbers S1, S2, S3, S4 and S5 refer to the wireless device and reference numbers S10, S11, S12, S13 and S15 refer to the network node. The purpose of this figure is to illustrate the correspondence between the steps performed in the node as a wireless device or a network node.

Hence, the method comprises the steps of obtaining S2, S11 radio condition measurements, wherein a respective first time value is associated to each radio condition measurement. The method further comprises obtaining S3, S12 position estimates defining the position of a wireless device performing the radio condition measurements, wherein a respective second time value is associated to each position estimate. The obtaining would be performed in different ways depending on if the method is performed in a wireless device or in a network node. The wireless device would typically perform S2, S3 the measurements, as will be explained in FIG. 5a, whereas the network node would typically receive S11, S12 the measurements from a wireless device.

The method further comprises determining S4a, S13 radio coverage by correlating each radio condition measurement to one of the obtained position estimates using the first and second time values. According to some aspects the coverage determination is initialized by receiving S1 and/or sending S10 an indication to initiate determination of radio coverage. The method steps will be further described in the detailed descriptions of the network node in FIG. 5b and the wireless device in FIG. 5a below.

Figure 5A:
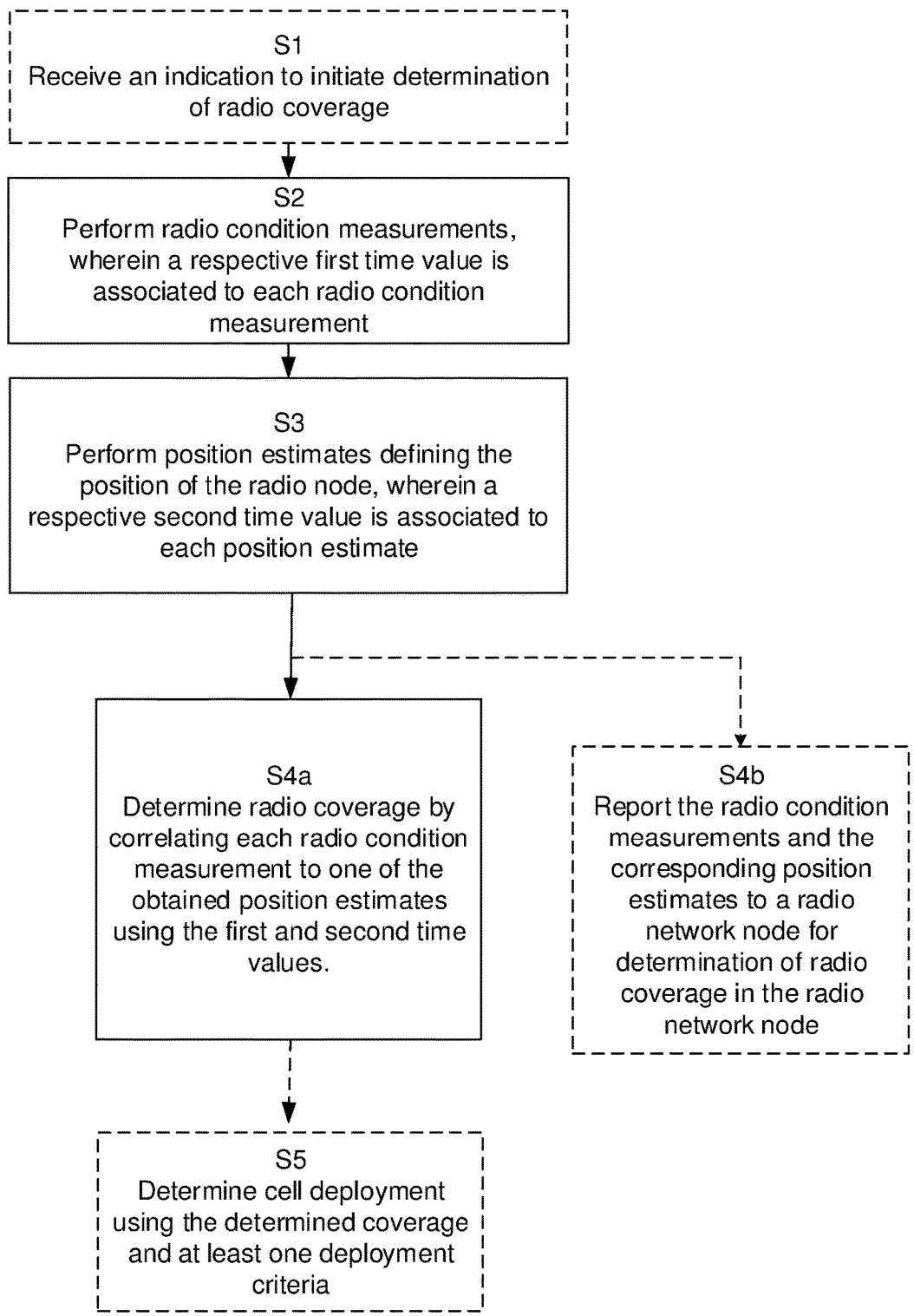
FIG. 5 is a flowchart schematically illustrating embodiments of method steps performed in a network node.

Some aspects of the invention, wherein the node where the proposed method is implemented is a wireless device 10, will now be described referring to FIG. 5a showing the method steps performed in the wireless device 10.

Coverage Determination Initiation

Coverage determination using a wireless device may be initiated when a small cell has been installed. According to some aspects, the coverage determination is initiated by the wireless device 10, receiving, S1, in an initial step, an indication to initiate determination of radio coverage. In this step, a wireless device 10, for example a wireless device capable of determining a position without GNSS information, receives/issues an indication or request to initiate radio condition measurement and position logging, wherein the indication is associated with a radio network deployment activity. The indication can be split into two indications, wherein one indication via the radio protocols instructs the wireless device to initiate radio condition measurements, and another indication via the application layer instructs the wireless device to initiate positioning.

The determination of coverage may be initiated in the wireless device 10, by a signal message exchange with a network node. For example, the wireless device 10 may send a message to the network node 110 informing that one or more base stations 21, 22 nodes have been installed, step S1a in FIG. 3. The message may also include one or more hardware identifier(s) identifying the base stations hardware. Furthermore, the message may also comprise an identifier of a planned site or a planned configuration. The network node 110 may respond with a confirmation message S10a which further may indicate that a base station 22 has been activated.

Alternatively, the logging may be initiated by a logging initiation message S1b. Such a message is sent for example when the wireless device 10 enters a building, part of a building, an area, etc., wherein the entering may for example be disclosed by:

- Monitoring an outdoor position. For example via GNSS or indoor position functionality in the wireless device 10, and determining that the position is in the vicinity of the building, part of building, building entrance, area, etc. wherein the determining of vicinity may be based on a pre-configured or configurable criterion such as a position determined to be within a region associated to the building, part of building, building entrance, area. One example of a region is a polygon, and another is all positions within a specific distance to a reference position.
- An identification of a starting point. For example by a wireless technology, such as Radio Frequency Identifier, RFID, Near-Field Communication, NFC, Bluetooth, Wi-Fi, supported by the wireless device 10, a visual tag identified by a visual sensor i.e. a camera, in the wireless device 10. The identification can also be based on vicinity or proximity identification, where the terminal determines that it is within a distance from a path starting point. The determination may be based on a comparison of the path starting position and the current terminal position. One such comparison is via a determined distance between the path starting position and the current terminal position, and where measurements are initiated when this distance is below a threshold. The threshold may be pre-configured, configured by a network node or by the user. The vicinity/proximity determination may also be based on a signal strength measurement associated an entity, for example associated with any of the aforementioned technologies.
- The indication of an activity in the wireless device 10. For example by selecting a task among one or more tasks from a pre-configured or configurable list, or activating a monitoring activity by using some human interaction device associated to the wireless device 10. The indication can also be via a specific excitation of sensors in the wireless device 10 such as a shake, flip or other pre-configured or configurable movement, an audible sound retrieved by a microphone, etc.

Also in the alternative case, the wireless device 10 may signal a message S1*b* to the network node 110 indicating the initiation of logging. The network node may also respond with a Logging initiation confirm message S10*b*. The wireless device 10 may alternatively initiate positioning without signalling any message to a network node.

According to some aspects, an indication to initiate determination is triggered by a Human Interface Device action in the wireless device 10.

Radio Condition Measurements

In the next step, the wireless device 10 performs S2 radio condition measurements, wherein a respective first time value is associated to each radio condition measurement.

According to some aspects, the indication received in step S0, also comprises information about radio frequency measurements. These measurements may be specified in terms of which radio access technology, RAT, that should be measured. For example, GSM EDGE Radio Access Network, GERAN, UMTS Terrestrial Ran Access Network, UTRAN, Universal Mobile Terrestrial System, UMTS, Evolved-UTRAN, E-UTRAN, Wi-Fi and Bluetooth are be examples of radio access technologies.

Radio condition measurements are, for example, Signal to interference Ratio, Radio Signal Strength, Radio Signal Quality, suitable coding and modulation scheme. The measurement may be Radio Signal Strength, RSS, or Radio Signal Quality, RSQ.

According to some aspects, the node is a wireless device and wherein the determination S2 comprises measuring frequencies in accordance with a schedule. According to some aspects, the determination S2 comprises performing the radio condition measurements in the control plane.

Radio condition measurements are already performed in mobile phones in the control plane and in accordance with applicable standards. Hence, this step does not necessarily imply introducing any new measurements, but possibly implies fetching data that is already available in the control plane. This may be implemented in different ways, for example, by letting an application, using an application plane processor fetching measurement data from a control plane processor, when the wireless device is positioned along the path. According to some aspects the proposed method then further comprises receiving S2*a*, from a network node, information defining the schedule. This implies e.g. that frequency for measurement reports is defined in the network. According to the 3PP specification TS 36.331 V9.13.0 a UE collects measurements on layer 1 and a time stamp is implicitly given to the measurement because the specification typically defines when to report and how old the measurements may be when the measurement is reported.

In the android operative system, an event or interrupt occurs when a new radio condition measurement value is available. Hence, one possible implementation would be to store the value once available, irrespective of the position of the wireless device. One would simply assume that the user moves along the configured path.

Another possibility is that the control plane generates new measurements at regular basis as for example in the IEEE 802.11 specification.

Another possibility would be to read the measurements from the control plane at regular intervals, or when the wireless device is positioned at certain positions.

According to some aspects, the measurements may be quantized and encoded to different representations. The measurement may also be translated into a corresponding bit rate. One example is a translation into a transport format, which corresponds to a coding, i.e. introducing redundancy to facilitate decoding, and modulation, i.e. determining how many bits that can be transferred in one symbol, scheme, MCS. In simple terms, a wireless device 10 may be asked to determine the transport format, e.g. modulation and coding, scheme that corresponds to a certain probability that the data is correctly decoded, or that the data needs to be resubmitted. In some systems, the MCS is reported to the wireless device 10 as a means to feedback radio conditions. Another example is channel rank, meaning to what extent the wireless device 10 observes opportunities to take advantages of multiple data streams in rich radio environments and facilitated by multiple antennas. A channel rank of two means that the wireless device 10 may receive two data streams, and more or less twice the data rate as with channel rank 1 and one data stream.

Position Estimation

In the next step, the wireless device 10 obtains, S3, position estimates corresponding to the radio condition measurements, by determining position estimates defining the position of the wireless device. This implies that the wireless device 10 initiates position logging, wherein each position estimate is associated to a second time value.

According to some aspects the step of performing S3 position estimates comprises performing the position estimates in the user plane.

The position estimation is for example based on outdoor GNSS or by some other network-assisted mechanisms, or based on capabilities in the wireless device 10 for example to support indoor positioning. Such positioning may utilize radio frequency measurements and onboard sensors in the wireless device 10. U.S. Pat. No. 8,498,811 is one example of a method for positioning a user inside a building, where a user has a user carried device and the user carried device is provided with a direction sensor and a movement sensor.

Figure 6:
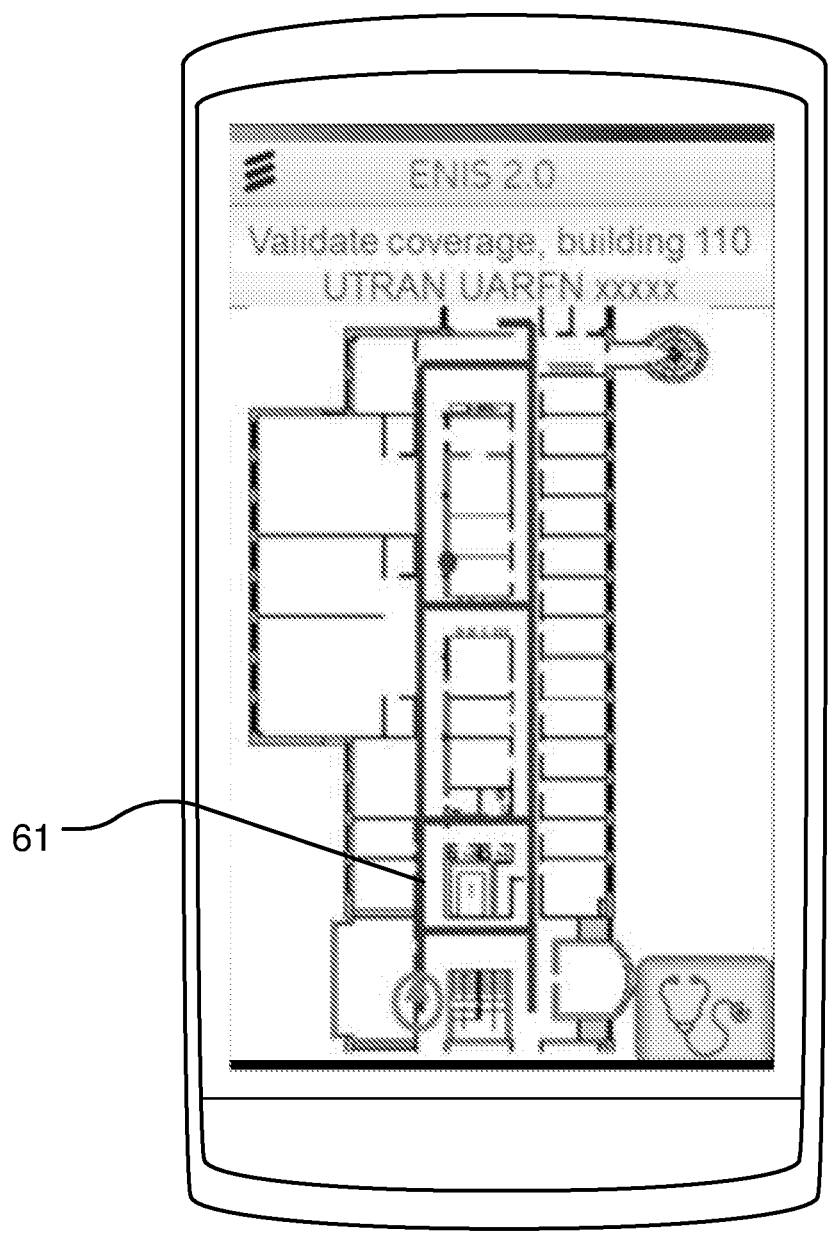
FIG. 6 shows an example of a path to be followed by the user and wireless device.

In some embodiments, the position estimates are positioned along at least one predefined path. Then the considered positions for logging position estimates and/or radio condition measurements are restricted to pre-configured or configurable paths. In case these are configured, this may be implemented as a configuration sent to the wireless device 10 from a network node S1c. Optionally, the wireless device 10 will also confirm S10c the successful reception of the configuration, see FIGS. 3 and 6. A configuration may correspond to one path or multiple paths, several buildings or one building or one part of a building or one building floor or one part of a building floor.

The user is following such paths possibly supported by visualization in the wireless device 10 of the path and the current position along the path. Thereby, the user can gradually complete the path 61, see illustration in FIG. 6. The path 61 may be one-directional and has to be completed from start to end, or such that every part of the path needs to have been visited before the path is completed but in any order.

According to some aspects, the position estimates are made using the at least one predefined paths. Then the path is one input parameter to the position estimation, which may for example be used in combination with sensors.

Optionally, the user initiates the positioning along a path via a HID, Human Interface Device, action e.g. like a start button, or a start menu item, or positioning is automatically initiated based on a vicinity determination that the wireless device 10 is close to the start of the current path. Optionally, the user finalizes the positioning along a path via a HID action e.g. a "Done" button, or a "Done" menu item, or positioning is automatically initiated based on a vicinity determination that the wireless device 10 is close to the end of the current path.

Optionally, the configuration also instructs the wireless device 10 to associate each position estimate to a time value.

Coverage Determination

In the next step, the wireless device 10 determines S4a radio coverage by correlating each radio condition measurement to one of the obtained position estimates using the first and second time values. Because the wireless device 10 has received a number of radio condition measurements that are each correlated to a corresponding position, it is now possible to create a map, wherein the radio condition in each measured position is known.

Hence, a first time value is associated to each radio condition measurement and a second time value is associated to each logged position estimate, and wherein each measurement is correlated to a logged position estimate using the first and second time values. Hence, the wireless device 10 will associate a first time value to each radio condition measurement in step S2. Based on the first time value, the wireless device 10 may associate the measurement to a position based on the position-time value tuples. One example is that the wireless device 10 selects the position that is associated to a second time value that is nearest in time to the first time value associated to the measurement. Another example is that the measurement is associated a position that is interpolated between positions associated to time values immediately before and after the time value of the measurements, typically also considering the time values of the considered positions.

Figure 7:
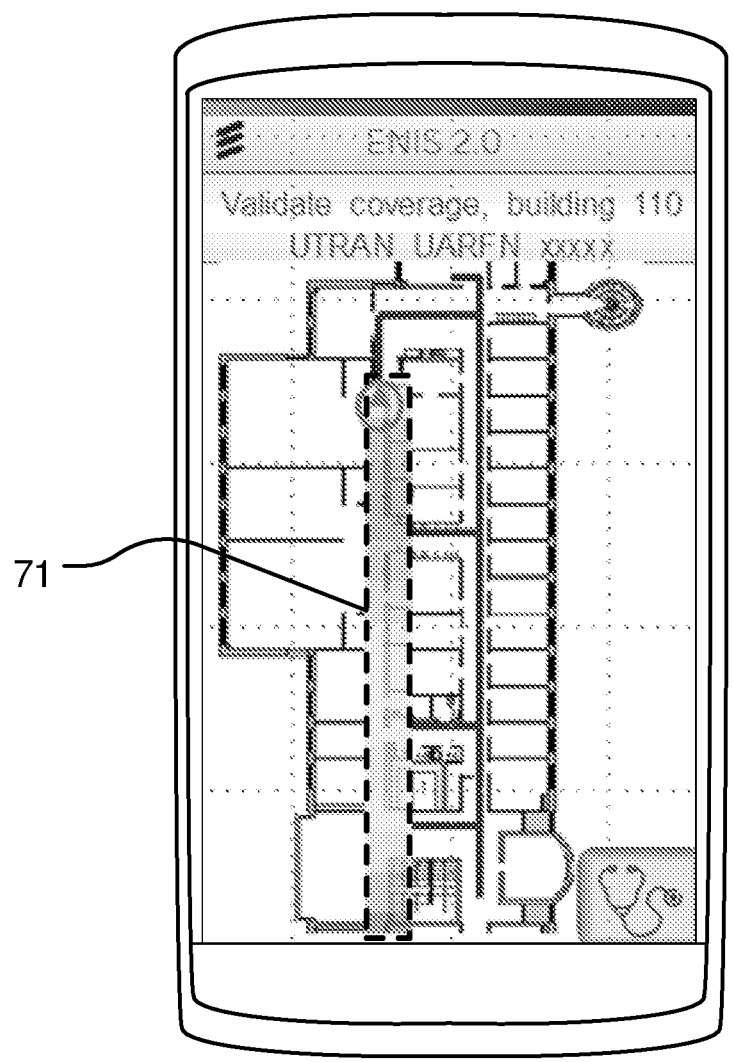
FIG. 7 shows an Example of a measurement visualization while logging measurements associated to positions in the wireless device.

According to some aspects, the wireless device 10 visualizes S5, or provides a graphical representation of, the determined coverage in the wireless device 10. In this mode of the embodiment, the wireless device 10 optionally visualizes the measurement on the screen of the wireless device 10 at a point on the screen that is related to the position associated to the measurement. The measurement visualization indicates the measurement for example with a color from a color map where the color is related to a measurement value, and the color map is related to a value range. The visualization of the measurement can remain on the screen to indicate positions the wireless device 10 already have visited to support the user determining the extent to which the path is completed. The positioned measurement values are also stored in memory in the wireless device 10. FIG. 7 provides an example, where the coverage is visualized as different shades within a measured area 71.

According to some aspects, the wireless device 10 determines S6 cell deployment using the determined coverage and at least one deployment criteria. According to some aspects, the deployment criteria comprise at least one of: an estimate of the inter-node distance, an estimate of the shortest distance to a window, a signal propagation model or dominance. In case the wireless device 10 has handled both measurements and positions, the wireless device 10 can be considered for automatic deployment planning. Based on the building maps, radio condition measurements and some pre-configured or configurable criterions, the wireless device 10 can be capable of determining a suitable deployment in the monitored area/building/part of building/building floor/part of building floor. In addition, it can be aware of parameters associated to the equipment considered for deployment, for example the transmission power of the considered node type.

Examples of such criterions include:
- An estimate of the inter-node distance. Like one node every 20 m.
- An estimate of the shortest distance to a window
- A signal propagation model, for example a signal power loss in dB per meter or per logarithm of the distance to the node in meters. The use of signal propagation models is discussed in more detail in connection with FIG. 11.
- A dominance criterion, meaning that the deployed cells shall provide coverage in the considered area that is dominating over other nodes in the area, based on the measurements. Predicted signal levels are considered for the nodes to be deployed When the wireless device 10 has completed the planning, it may signal the proposed deployment to a network node for confirmation.

In case the measurement campaign is due to that a completed deployment in the considered area is to be validated, then the wireless device 10 may optionally validate the deployment with respect to some pre-configured or configurable criterion
- A signal propagation model, for example a signal power loss in dB per meter or per logarithm of the distance to the node in meters. The use of signal propagation models is discussed in more detail in connection with FIG. 11.

A dominance criterion, meaning that the deployed cells shall provide coverage in the considered area that is dominating over other nodes in the area, based on the measurements. Predicted signal levels are considered for the nodes to be deployed In case all measurements and positions are handled by the wireless device 10, the wireless device 10 may signal the positioned measurements to a network node, either in one batch, in regular batches, or once a new measurement is available in the wireless device 10.

Network Node Embodiment

Figure 5B:
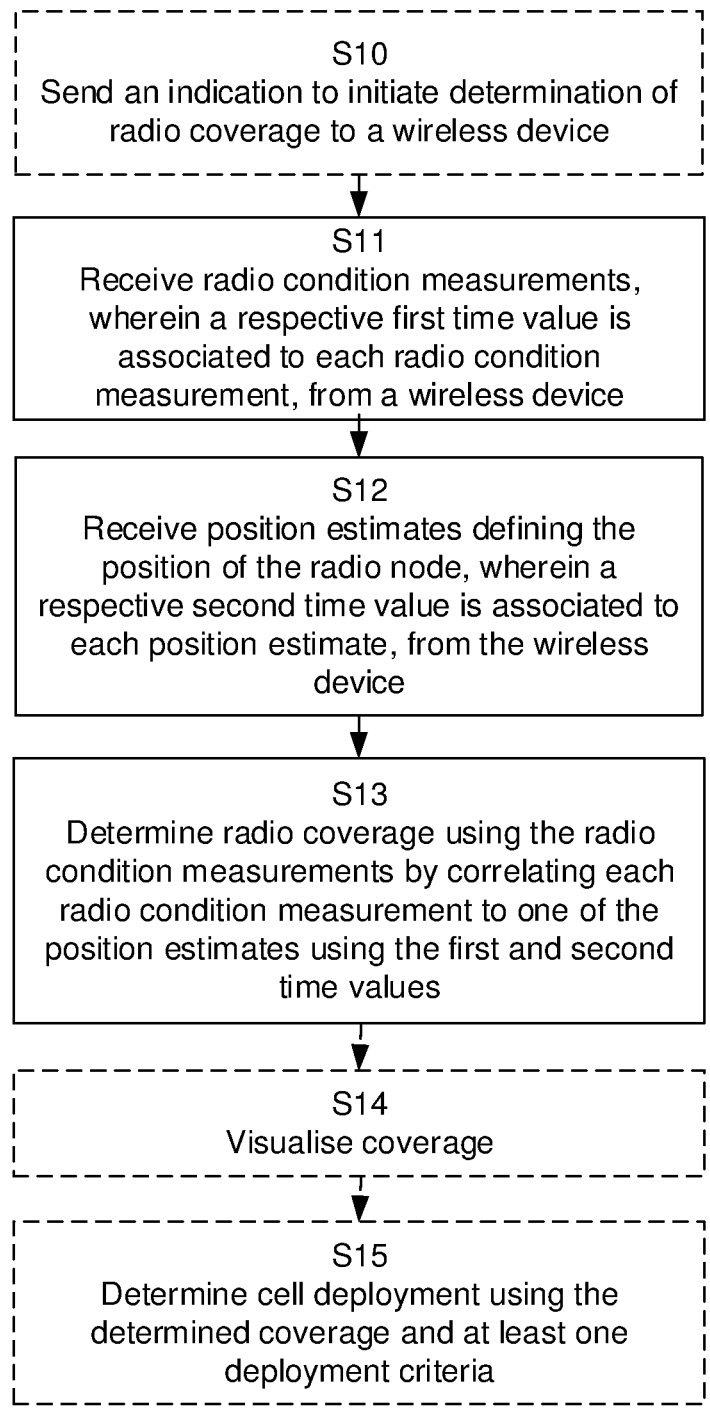
Figure 9:
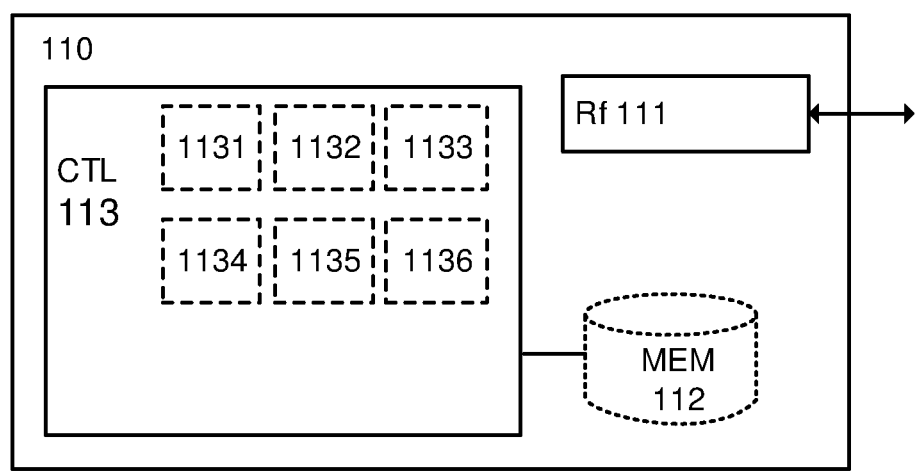
FIG. 9 is a block diagram schematically illustrating a network node, for performing the method steps.

Turning now to FIG. 5b, another embodiment, wherein a method performed in a network node 110, see FIG. 9, in a wireless communications network, of determining radio coverage using at least one wireless device 10 being connected to the wireless communications network, will be briefly described. For example, the radio condition measurements are configured by the serving base station, as ordered by a different network node, and which in turn may have been ordered by yet another network node. According to this aspect, the wireless device 10 reports S4b the radio condition measurements and the corresponding position estimates to a network node 110 for determination of radio coverage in the network node 110.

Hence, in this embodiment, the determination of coverage is performed in a node being a network node 110. According to some aspects, the method comprises sending S10 to a wireless device 10 an indication to initiate determination of radio coverage.

According to some aspects, the indication also comprises information about radio frequency measurements.

According to some aspects, the indication may list which RATs and frequency carriers that the wireless devices 10 should consider.

In one example embodiment, a measurement configuration is initiated in a network management node and sent to the Mobility Management Entity, MME. The measurement configuration may list which RATs and frequency carriers that the wireless devices 10 should consider. The configuration may also identify the wireless device 10, typically via its subscription identifier, International Mobile Subscription Identifier, IMSI.

The MME further signals a measurement configuration to the base station serving the wireless device 10. The base station configures the wireless device 10 with measurement configurations, typically periodic measurements of radio signal strength and radio signal quality. Such measurements are readily handled on the serving RAT and carrier, but for measurements on other carrier/RAT combinations, the base station may need to configure measurement gaps i.e. idle periods when the wireless device can expect no scheduled data. The need for measurement gaps also depends on the wireless device 10 capability and whether the wireless device 10 is capable of simultaneously measuring on more than one carrier and/or RAT.

The wireless device 10 is further configured to, typically periodically but possibly also batch-wise, report the measurements to the serving base station e.g. base station 20. Either the wireless device 10 or the base station 20 will tag the measurements with a time value.

The base station will forward the measurements to a network node, or a network management system node, or a database server in the management system. Hence, in the next step the network node obtains S11 radio condition measurements, wherein a respective first time value is associated to each radio condition measurement, by receiving S11 radio condition measurements from a wireless device 10. According to some aspects, the radio condition measurements are received in accordance with a schedule.

According to some aspects, the step of obtaining S2 radio condition measurements comprises receiving the radio condition measurements from a wireless device, wherein the measurements are performed in the control plane. User equipments typically signal measurements to their access points in the control plane. The measurements values may be utilized by the network node for coverage determination.

According to some aspects, obtaining S3 position estimates comprises receiving the position estimates in the user plane.

In the next step the network node receives S12 position estimates corresponding to the received radio condition measurements. According to some aspects, the radio condition measurements and the position estimates are received batch wise.

In the next step the network node determines S13 radio coverage by correlating each radio condition measurement to one of the obtained position estimates using the first and second time values. The correlation may be performed in the same way in the network node as explained in connection with the wireless device above.

According to some aspects, the network node visualizes S14 the determined coverage.

Figure 10:
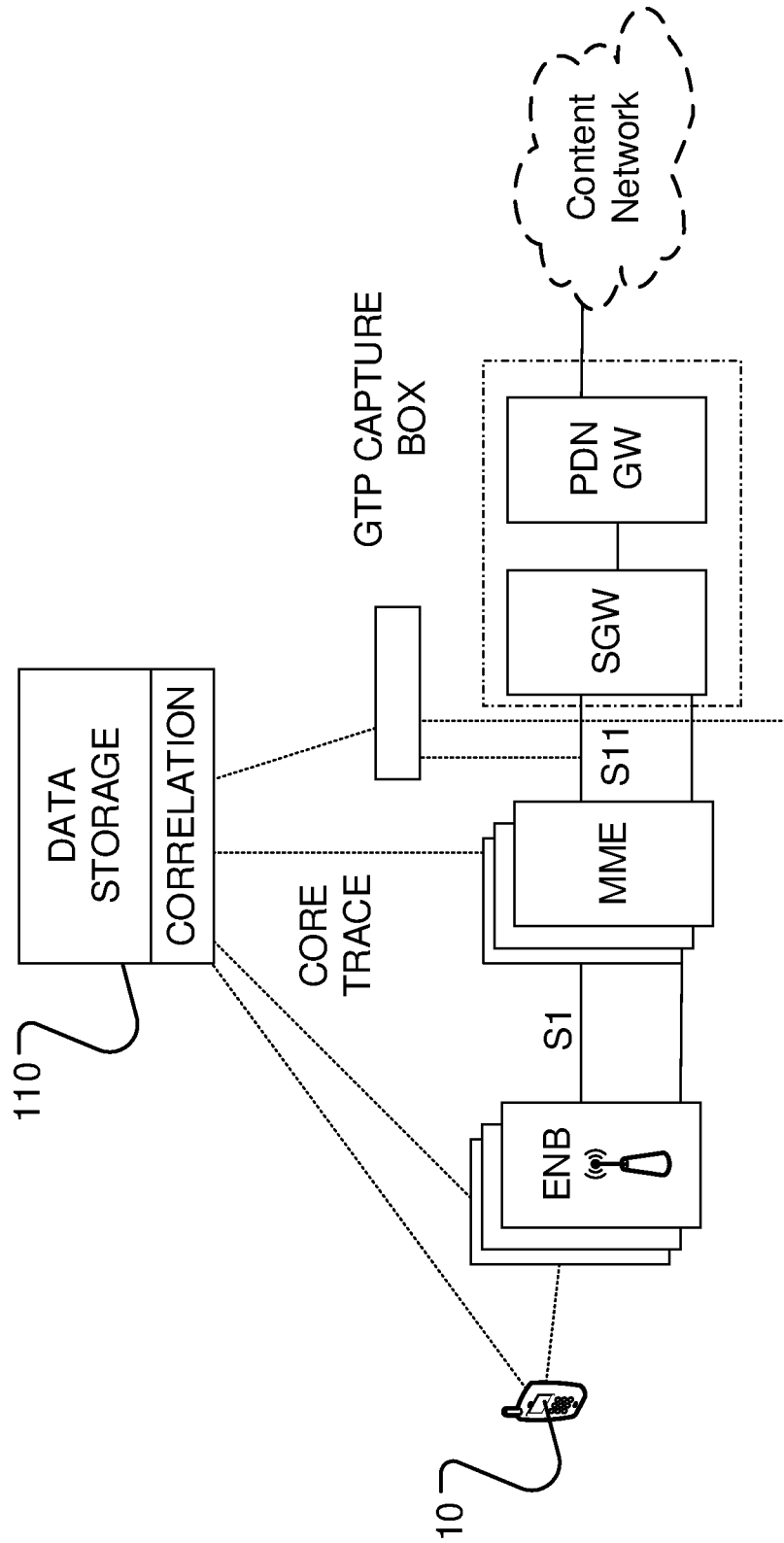
FIG. 10 illustrates an example of a Management System where the radio and core information and location data is processed.

FIG. 10 illustrates one architecture supporting the reporting, where the reporting from the base station to the management system is either via a cell trace or a UE here called wireless device 10, trace. Furthermore, an enhanced view of the performance can be obtained via probes also in the core network nodes MME, Serving gateway, SGW, and Packet Data Network Gateway, PDN GW, through which the wireless device 10 control plane and user plane data flows. This means that in some embodiments, it is also possible to consider user plane measurements such as bit rates and latency to a time value, which can be related to a position in the management system. One advantage with the network embodiment, is that the wireless device 10 is more likely to be able to measure on more than one carrier and/or RAT at the time since the base station can initiate such measurements, while the operating system in the wireless device 10 may be unable to configure the wireless device 10 to perform all desired measurements simultaneously. Instead, in the former case, the user may need to traverse the paths more than once to cover all configured carriers and RATs.

According to some aspects, the network node determines S15 cell deployment using the determined coverage and at least one deployment criteria. According to some aspects, the deployment criteria comprise at least one of: an estimate of the inter-node distance, an estimate of the shortest distance to a window, a signal propagation model or a dominance criterion.

In case the network receives both measurements and positions, the network can be considered for automatic deployment planning. Based on the building maps, radio condition measurements and some pre-configured or configurable criterions, the wireless device 10 can be capable of determining a suitable deployment in the monitored area/building/part of building/building floor/part of building floor. In addition, it can be aware of parameters associated to the equipment considered for deployment, for example the transmission power of the considered node type.

Figure 8:
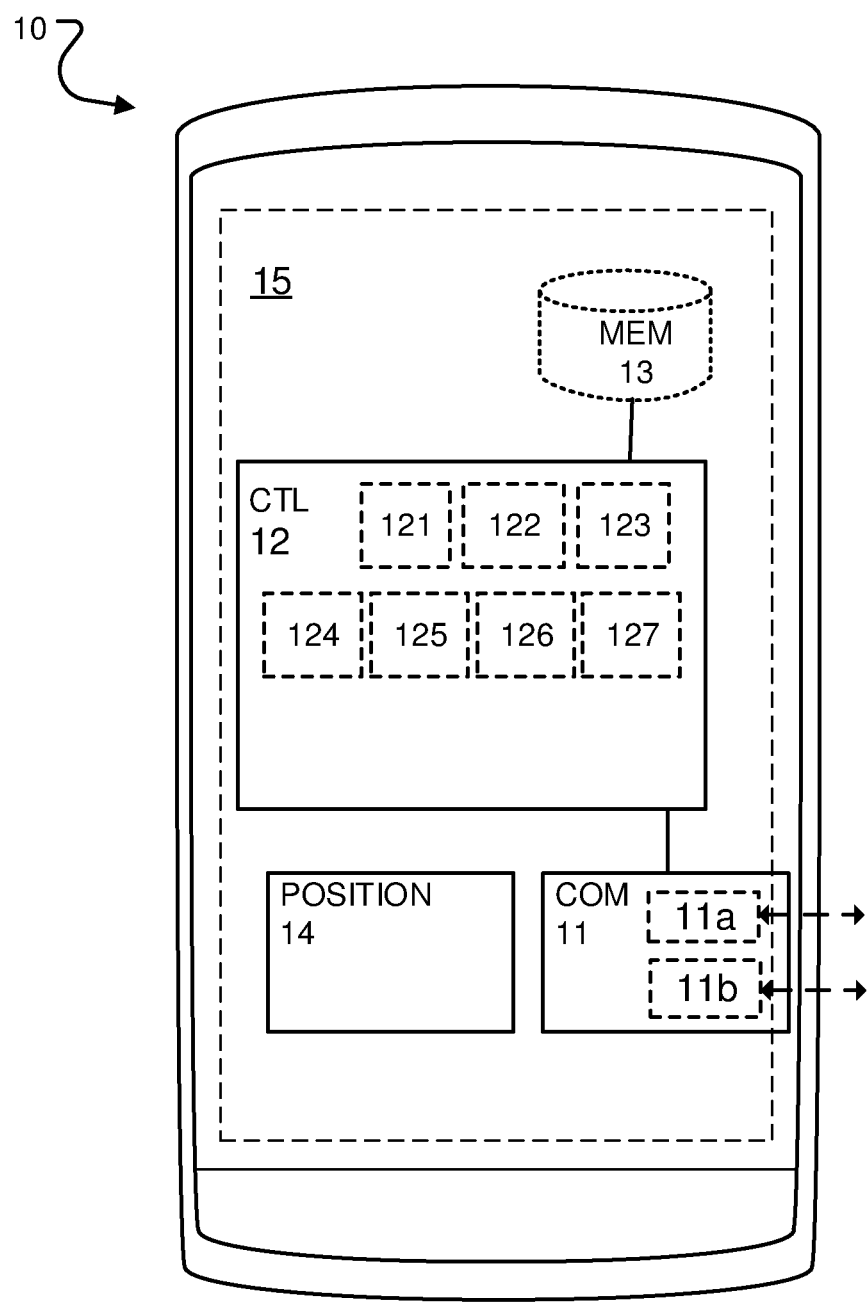
FIG. 8 is a block diagram schematically illustrating a wireless device, for performing the method steps.

Examples of such criterions include
1. An estimate of the inter-node distance. Like one node every 20 m.
2. An estimate of the shortest distance to a window
3. A signal propagation model, for example a signal power loss in dB per meter or per logarithm of the distance to the node in meters. The use of signal propagation models is discussed in more detail in connection with FIG. 11.
4. A dominance criterion, meaning that the deployed cells shall provide coverage in the considered area that is dominating over other nodes in the area, based on the measurements. Predicted signal levels are considered for the nodes to be deployed In case the measurement campaign is due to that a completed deployment in the considered area is to be validated, then the network may optionally validate the deployment with respect to some pre-configured or configurable criterion
5. A signal propagation model, for example a signal power loss in dB per meter or per logarithm of the distance to the node in meters. The use of signal propagation models is discussed in more detail in connection with FIG. 11.
6. A dominance criterion, meaning that the deployed cells shall provide coverage in the considered area that is dominating over other nodes in the area, based on the measurements. Predicted signal levels are considered for the nodes to be deployed Turning now to FIG. 8, a schematic diagram illustrating some modules of an example embodiment of a wireless device 10 configured for determining radio coverage, will be described. In this application a wireless device 10 or wireless device 10 is any wireless device able to wirelessly connect to a wireless network. The wireless device 10 is typically a smartphone or an M2M device.

The wireless device 10 comprises a controller, CTL, or a processing circuitry 12 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Random Access Memory, RAM, and a Read Only Memory, ROM. The memory 13 may also comprise persistent storage, which, for example, can be any single one or combination of magnetic memory, optical memory, or solid state memory or even remotely mounted memory.

The wireless device 10 further comprises a radio communication interface (i/f), COM 11. The radio communication interface 11 is arranged for wireless communication with access points or wireless devices within range of the wireless device 10. If several technologies are supported, the node typically comprises several radio communication interfaces, for example one LTE interface 11a and 5G communication interface 11b. The radio communication interfaces 11a, 11b, are for example adapted to communicate with access nodes 20, 21, 22. The wireless device 10 is thereby configured to communicate with the network node 110 over a cellular network. The radio communication interface is further configured for performing radio condition measurements.

The wireless device 10 further comprises a position estimation circuitry 14 configured for estimating the position estimates corresponding of the wireless device. The wireless device typically also comprises a display 15 and input means for example a touch screen for human interaction.

According to some aspects the disclosure further relates to the above mentioned computer program, comprising computer readable code which, when run on a wireless device 10, causes the node to perform any of the aspects of the method described above.

When the computer readable code is run in the processing circuitry 11 of the wireless device 10, it causes the wireless device 10 to receive, using the radio communication interface, an indication to initiate determination of radio coverage and to perform radio condition measurements using the radio communication interface. The wireless is further caused to log position estimates corresponding to the radio condition measurements. The wireless device 10 is further caused to determine radio coverage using the radio condition measurements and corresponding position estimates. Alternatively the wireless device is caused to report the radio condition measurements and the corresponding position estimates to a network node for determination of radio coverage in the network node.

In accordance with the proposed technique, the wireless device is configured to obtain S2 radio condition measurements, wherein a respective first time value is associated to each radio condition measurement, to obtain S3 position estimates defining the position of the wireless device, wherein a respective second time value is associated to each position estimate; and to determine S4a radio coverage by correlating each radio condition measurement to one of the obtained position estimates using the first and second time values.

According to some aspects of the disclosure the processing circuitry 12 comprises one or several of:
 a receiver module 121 configured to receive an indication to initiate determination of radio coverage,
 a measurement module 122 configured to receive perform radio condition measurements, wherein a respective first time value is associated to each radio condition measurement,
 a position logging module 123 configured to receive position estimates corresponding to the radio condition measurements, wherein a respective second time value is associated to each position estimate, and
 a determiner 124 configured to receive determine S4a radio by correlating each radio condition measurement to one of the obtained position estimates using the first and second time values and/or
 a report module 125 configured to receive reporting S4b the radio condition measurements and the corresponding position estimates to a network node for determination of radio coverage in the network node.

According to some aspects the disclosure the processing circuitry 12 further comprises a second visualization module 126 configured to visualize S5 the determined coverage in the wireless device 10.

According to some aspects the disclosure the processing circuitry 12 further comprises a deployment module 127 configured to determine S6 cell deployment using the determined coverage and at least one deployment criteria.

The modules 121-127, are implemented in hardware or in software or in a combination thereof. The modules 121-127, are according to some aspects implemented as a computer program stored in a memory 13 which run on the processing circuitry 12. The wireless device 10 is further configured to implement all the aspects of the disclosure as described in relation to the methods above. The processing circuitry 12 also comprises the corresponding modules.

Turning now to FIG. 9, a schematic diagram illustrating some modules of an example embodiment of a network node 110 in the network management system assisted by a wireless device 10, will be described.

The network node 110 comprises a controller, CTL, or a processing circuitry 113 that may be constituted by any suitable Central Processing Unit, CPU, microcontroller, Digital Signal Processor, DSP, etc. capable of executing computer program code. The computer program may be stored in a memory, MEM 112. The memory 112 can be any combination of a Random Access Memory, RAM, and a Read Only Memory, ROM. The memory 112 may also comprise persistent storage, which, for example, can be any single one or combination of magnetic memory, optical memory, or solid state memory or even remotely mounted memory.

The network node 110 further comprises a communication interface 111 configured to communicate with other nodes in the cellular network.

According to some aspects the disclosure further relates to the above mentioned computer program, comprising computer readable code which, when run on a radio network module, causes the network node to perform any of the aspects of the method described above.

When the above-mentioned computer program code is run in the processing circuitry 12 of the network node 110, it causes the network node 110 to receive S11 radio condition measurements, receive S12 position estimates corresponding to the received radio condition measurements, and determine S13 radio coverage using the radio condition measurements and corresponding position estimates.

In accordance with the proposed technique, the network node 110 is configured to obtain S11 radio condition measurements, wherein a respective first time value is associated to each radio condition measurement, to obtain S12 position estimates defining the position of a wireless device performing the radio condition measurements, wherein a respective second time value is associated to each position estimate; and to determine S13 radio coverage by correlating each radio condition measurement to one of the obtained position estimates using the first and second time values.

According to some aspects the disclosure further relates to the above mentioned computer program, comprising computer readable code which, when run on a network node, causes the network node to perform any of the aspects of the method described above.

According to some aspects of the disclosure the controller comprises one or several of:
- a first receiver module 1131 configured to receive radio condition measurements, wherein a respective first time value is associated to each radio condition measurement,
- a second receiver module 1132 configured to 1132 position estimates corresponding to the received radio condition measurements, wherein a respective second time value is associated to each position estimate, and
- a determination module 1133 configured to determining 1133 radio coverage by correlating each radio condition measurement to one of the obtained position estimates using the first and second time values.

According to some aspects the network node 110 is further adapted to send to a wireless device 10 an indication to initiate determination of radio coverage. According to some aspects the controller 113 comprises a sender module 1134 configured for this purpose.

According to some aspects the network node 110 is further adapted to visualize the determined coverage in the wireless device 10. According to some aspects the controller 113 comprises a visualization module 1135 configured for this purpose.

According to some aspects the network node 110 is further adapted to determine suitable cell deployment using the determined coverage and at least one deployment criteria. According to some aspects the controller 113 comprises a visualization module 1136 configured for this purpose.

The modules 1131 to 1136 are implemented in hardware or in software or in a combination thereof. The modules 1131 to 1136 are according to some aspects implemented as a computer program stored in the memory 112 which run on the processing circuitry 113. The network node 110 is further configured to implement all the aspects of the disclosure as described in relation to the methods above.

FIG. 11 illustrates some aspects of signal propagation models that optionally may be considered in different embodiments of the disclosure. The figure visualizes signal measurements 1101 with respect to a wireless device versus the distance between the position at which the measurement was obtained to the position of the wireless device. The signal propagation can be associated to a propagation model, either with pre-configured or configurable parameters, or parameters that are estimated based on measurements. Two typical model structures include
a radio signal strength P that decreases linearly with distance d:

$$P(d)=C1+C2*d,$$

where C1 and C2 are parameters, see curve 1103.
a radio signal strength P that decreases linearly with the logarithmic distance $\log_{10}(d)$ $$P(d)=C3+C4*d,$$

where C3 and C4 are parameters, see curve 1102.

The model selection and the parameter values may be pre-configured or configurable by the network node, but the parameters can also be estimated based on measurements by either the terminal or the network node. Since these models are linear, the parameters can be estimated via linear regression.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as wireless device should be considered as non-limiting. A wireless device, wireless terminal or user equipment as the term is used herein, is to be broadly interpreted to include a radiotelephone having ability for Internet/intranet access, web browser, organizer, calendar, a camera e.g., video and/or still image camera, a sound recorder e.g., a microphone, and/or global positioning system, GPS, receiver; a personal communications system, PCS, user equipment that may combine a cellular radiotelephone with data processing; a personal digital assistant, PDA, that can include a radiotelephone or wireless communication system; a laptop; a camera, e.g., video and/or still image camera, having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

Aspects of the disclosure are described with reference to the drawings, for example, block diagrams and/or flowcharts. It is understood that several entities in the drawings, for example, blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed example aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a node in a radio network, of determining radio coverage of at least one small cell base station in a wireless communications network, the method comprising:
   obtaining radio condition measurements, wherein a respective first time value is associated to each radio condition measurement;
   obtaining position estimates defining the position of a wireless device performing the radio condition measurements, wherein a respective second time value is associated to each position estimate; and
   determining radio coverage by correlating each radio condition measurement to one of the obtained position estimates using the first and second time values, wherein determining includes interpolating between position estimates that are associated with the second time values that are immediately before and immediately after the first time value of the corresponding radio condition measurement.

2. The method of claim 1, further comprising receiving and/or sending an indication to initiate determination of radio coverage.

3. The method of claim 1, further comprising determining cell deployment using the determined coverage and at least one deployment criteria.

4. The method of claim 3, wherein the deployment criteria comprises at least one of: an estimate of the inter-node distance; an estimate of the shortest distance to a window; a signal propagation model; a dominance criterion.

5. The method of claim 1, wherein the correlating comprises selecting the position estimate that is associated to a second time value closest in time to the first time value, for each radio condition measurement.

6. The method of claim 1, wherein the radio condition measurements comprises at least one of: Signal to Interference Ratio; Radio Signal Strength; Radio Signal Quality; suitable coding and modulation scheme.

7. The method of claim 1:
   wherein the node is a wireless device; and
   wherein the obtaining radio condition measurements comprises measuring frequencies in accordance with a schedule.

8. The method of claim 7, further comprising receiving, from a network node, information defining the schedule.

9. The method of claim 7, wherein the obtaining radio condition measurements comprises performing the radio condition measurements in the control plane.

10. The method of claim 7, wherein the obtaining position estimates comprises performing the position estimates in the user plane.

11. The method of claim 1:
    wherein the node is a network node; and
    wherein the obtaining radio condition measurements comprises receiving the radio condition measurements from at least one wireless device in accordance with a schedule.

12. The method of claim 11:
    wherein the obtaining radio condition measurements comprises receiving the radio condition measurements from a wireless device;
    wherein the measurements are performed in the control plane.

13. The method of claim 11, wherein the obtaining position estimates comprises receiving the position estimates in the user plane.

14. The method of claim 1, wherein each radio condition measurement corresponds to the respective first time value that indicates a time in which that radio condition measurement was obtained.

15. The method of claim 1, wherein each position estimate corresponds to the respective second time value that indicates a time in which that position estimate was obtained.

16. The method of claim 1, wherein said obtaining the position measurements is based on spatial information.

17. The method of claim 16, wherein the spatial information is associated with a direction sensor or a movement sensor of the wireless device.

18. The method of claim 16, wherein the spatial information is associated with a satellite positioning system or a network assisted positioning system.

19. The method of claim 16, wherein the spatial information is associated with an indoor environment.

20. A node configured to determine radio coverage, the node comprising:
 a communication interface; and
 processing circuitry;
 memory containing instructions executable by the processing circuitry whereby the node is operative to:
  obtain radio condition measurements, wherein a respective first time value is associated to each radio condition measurement;
  obtain position estimates defining the position of a wireless device performing the radio condition measurements, wherein a respective second time value is associated to each position estimate; and
  determine radio coverage by correlating each radio condition measurement to one of the obtained position estimates using the first and second time values, wherein the determination of the radio coverage includes a step of interpolating between position estimates that are associated with second time values that are immediately before and immediately after the first time value of the corresponding radio condition measurement.

21. The node of claim 20, wherein the node is a wireless device.

22. The node of claim 21, further comprising position estimation circuitry configured to estimate position estimates defining the position of the wireless device.

23. The node of claim 20, wherein the node is a network node.

24. A computer program product stored in a non-transitory computer readable medium for controlling a network node to determine radio coverage of at least one small cell base station in a wireless communications network, the computer program product comprising software instructions which, when run on processing circuitry of the network node, causes the network node to:
 obtain radio condition measurements, wherein a respective first time value is associated to each radio condition measurement;
 obtain position estimates defining the position of a wireless device performing the radio condition measurements, wherein a respective second time value is associated to each position estimate; and
 determine radio coverage by correlating each radio condition measurement to one of the obtained position estimates using the first and second time values, wherein the determination of the radio coverage includes a step of interpolating between position estimates that are associated with second time values that are immediately before and immediately after the first time value of the corresponding radio condition measurement.

\* \* \* \* \*